United States Patent
Moore

[15] 3,690,702
[45] Sept. 12, 1972

[54] CONNECTION ASSEMBLY FOR FLUID PRESSURE LINES

[72] Inventor: Charles H. Moore, 645 Matanzas Court, Fort Myers Beach, Fla. 33931

[22] Filed: July 28, 1971

[21] Appl. No.: 166,659

[52] U.S. Cl. .................................. 285/156, 285/286
[51] Int. Cl. .............................................. F16l 13/02
[58] Field of Search ..................... 285/286, 189, 156

[56] References Cited

UNITED STATES PATENTS

| | | | |
|---|---|---|---|
| 691,454 | 1/1902 | Dies | 285/156 X |
| 977,740 | 12/1910 | Higgins | 285/156 |
| 993,883 | 5/1911 | Schickert | 285/189 X |
| 2,886,881 | 5/1959 | Huet | 285/286 X |
| 3,186,431 | 6/1965 | Moore | 285/286 X |

FOREIGN PATENTS OR APPLICATIONS

| | | | |
|---|---|---|---|
| 828,581 | 2/1960 | Great Britain | 285/286 |
| 85,947 | 8/1957 | Netherlands | 285/286 |

Primary Examiner—Thomas F. Callaghan
Attorney—Robert U. Geib, Jr.

[57] ABSTRACT

A metallic pipe connector for T's, crosses, bends, or a combination of such, and either full size or reducing, consists essentially of a pair of substantially identical semispherical shells in opposed relationship with their adjoining edges secured together with a continuous weld, thus forming a hollow sphere. This hollow sphere is provided with at least two circular openings therein, the axes of which are spaced from the adjoining edges of the semispherical shells at an angle of approximately 45°. The metal surrounding at least one, and in some instances all, of the circular openings is displaced into an outwardly projecting or "flued" portion; and the wall-thickness of the sphere with respect to the diameter of the openings therein being so arranged that there is sufficient metal between the openings to adequately compensate by way of reinforcement for the weakening of the walls of the sphere caused by the initial placing of the aforementioned openings therein. A pipe abuts the outer end of the circular collar "flued" portion to thus communicate with the interior of the sphere, the internal diameter and wall-thickness of each of the pipes corresponding to the wall-thickness and diameter of the outer end of the flue with which it communicates; and the adjacent ends of the pipes are secured to the flues by continuous welds. The cross-section of the wall of each of the outwardly projecting or "flued" portions is such as to provide sufficient metal in the area of reinforcement to adequately compensate by way of reinforcement for the weakening of the wall of the semisphere to which it is attached which was caused by the placing of the circular opening therein and with which it communicates.

4 Claims, 9 Drawing Figures

Patented Sept. 12, 1972

Charles H. Moore
INVENTOR

BY Robert U. Geib, Jr.
ATTORNEY

Patented Sept. 12, 1972

Charles H. Moore
INVENTOR

BY Robert U. Geib, Jr.
ATTORNEY

CONNECTION ASSEMBLY FOR FLUID PRESSURE LINES

The present invention relates to connection assemblies for pressure lines for fluids under relatively high pressure, and more particularly to the use of a suitably apertured hollow metallic spherical element of a certain type which is connected to, and communicates with, the pipes or tubes of the pressure line in a certain way; all of which will be described hereinafter.

It is, of course, very well-known that many methods have been proposed for joining pressure pipes, as well as the insertion or application therein of branch outlets such, for example, as a standard T. Such T's usually maintain the same wall-thicknesses of the main pipe with which they were to be associated; and in some instances the crotch portions where the take-off branch was disposed were, for reenforcement purposes, provided with additional thickness.

Any opening made in a main pipe for a branch connection necessarily interrupts the uniformity of the hoop stresses in the wall of the main pipe and results in these stresses being concentrated and intensified at the edges defining the opening. These hoop stresses are directly proportional to the pressure and the diameter of the main pipe and inversely proportional to the wall-thickness of said pipe.

It is generally recognized that the connection of the branch outlet at the crotch is the weak point in connections of this general character and must be given all consideration where excessively high pressures or temperatures are encountered. Moreover, it is also well-recognized that the absence of sharp shoulders at the take-off opening is essential in obtaining maximum pressures in the take-off line, i.e. a substantial radius must be provided. Furthermore, the reinforcement of the branch outlet is required in order that the connection may withstand the greater stresses arising from expansion, contraction, pulsation and internal pressure than would be the case in a straight line run.

As further stated in my U.S. Pat. No 3,186,431 in an effort to accomplish proper flow and reinforcements of the devices briefly described hereinbefore, manufacturers have been subjected to considerable expense due to the great variety of line pipe sizes and branch outlets required, which resulted in heavy investment in dies; and the burdensome stocking of many different sizes. Prior art devices made for use in connection with pipe of standard weight are practically useless in instances where extra heavy and thicker walled pipes are now made in keeping with the present trend toward increasing pressures.

Reinforcement of weakness at branch connections is often necessary; and, as indicated earlier herein, it may be obtained by making the walls of the pipe heavier at that point where reinforcement is required, or by the use of an external reinforcing member. In any case, such procedures are not only costly but inefficient.

The device of my aforementioned U.S. Pat. No. 3,186,431 overcomes many of the disadvantages of the practices of the prior art referred to hereinbefore and it may be simply and easily manufactured and installed. It provides a connection for fluid pressure lines regardless of size or weight which may, with comparative ease, be inserted securely in the pressure line to provide means whereby outlets, take-offs, or other devices may be tapped or connected therein by simple and inexpensive processes, while assuming maximum fluid pressure in the take-offs.

The rules for strengthening such joints are established by various Codes, such as the A.S.A. Code for pressure piping, the A.S.M.E. power boiler Code, or by such manufacturing Codes as the A.S.A. Standard B–16.9.

Briefly stated, the Codes referred to define the area of reinforcement as the area of a rectangle of two times the opening in the center-line by two and one-half times the wall-thickness in height. The number of inches to be reinforced is the diameter of the opening times the required wall-thickness as square inches.

Both the invention of my U.S. Pat. No. 3,186,431 and the present invention are well-adapted to provide reinforcement of the type referred to.

The present invention is in the nature of an improvement over the invention of my aforementioned patent in that it provides continuous annular welds between the pipes and the sphere which are spaced outwardly from the periphery of the sphere, and which, it is found, more readily lend themselves to X-ray examination while at the same time not sacrificing any of the advantages referred to.

With these and other objects definitely in view, this invention comprises the novel construction, combination and arrangement of elements as will be hereinafter described in the specification, particularly pointed out in the claims, and illustrated in the accompanying drawings which form a material part of this disclosure and wherein similar reference characters designate the same elements, and in which:

Figure 1:
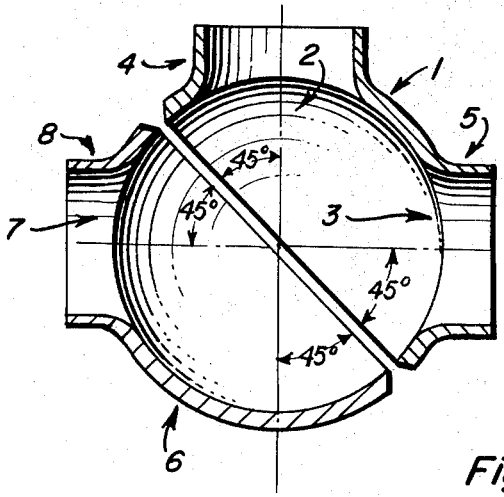
FIG. 1 is an elevational view illustrating one of the components of the hollow spherical pipe connector member of the present invention at a certain stage of its manufacture.

Referring more particularly to the drawings, the numeral 1 designates a semi-spherical shell which is forged or pressed from a flat circular plate of suitable metallurgical composition, which as such forms no part of the present invention. This semi-spherical metallic shell is shown as provided with two circular openings 2 and 3, each of which is, for very important reasons to be described hereinafter, on an axis that forms an angle of substantially 45° to a plane containing the periphery or edge of said shell.

According to the teachings of the present invention, the metal mass surrounding each of the two circular openings 2 and 3 is drawn or pulled to form an integral outwardly extending collar or flue, as indicated at 4 and 5, respectively.

A second semi-spherical metallic shell 6 is obtained in the same manner as the first semi-spherical shell 1; and it is shown as providing a single circular opening 7 which is on an axis that forms an angle of substantially 45° to a plane containing the peripheral edge of the shell.

The metal mass surrounding the circular opening 7 in the second semi-spherical shell 6 is drawn or pulled to form an integral outwardly extending collar or flue 8.

It will be understood by those skilled in the art that the formation of a semi-spherical shell from a flat circular plate will result in a slight tapering of the thickness of the metal from the center toward the periphery; that the formation of the circular openings 2, 3 and 7 weakens the metal surrounding the same; and that the drawing or pulling of the integral collars or flues 4, 5 and 8 results in the tapering of the thicknesses of the sidewalls outwardly toward the ends thereof.

Figure 3:
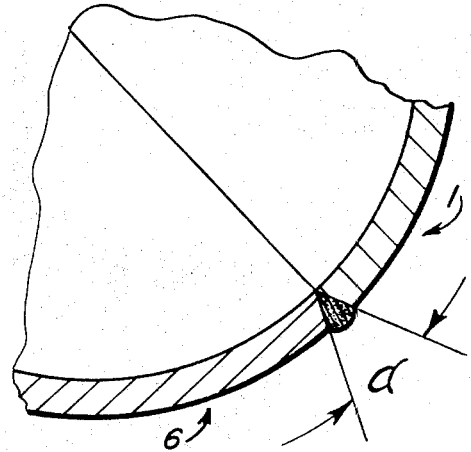
FIG. 3 is an enlarged fragmentary sectional view illustrating the manner in which two hemispheres are joined together to form the novel flued spherical connector member of the invention.

As in the case of my aforementioned U.S. Pat. No. 3,186,431, the meeting or adjoining edges of the semi-spherical steel shells 1 and 6 are bevelled on their outer peripheral portions at approximately 37.5° (provided the wall-thickness is no greater than three-fourths inch) and joined together by a continuous weld. In FIG. 3, alpha indicates the included angle.

The adjoining bevelled portions of a pair of assembled semi-spherical steel shells 1 and 6, are shown in FIG. 3; and, in the interests of accuracy, etc. they are preferably formed by machining. However, they may be formed by burning.

The outer ends of the outwardly extending annular collars or flues 4, 5 and 8 which communicate with the interior of the hollow sphere formed by the joined semi-spheres 1 and 6, are secured to, and communicate with, the adjoining ends of fluid pressure pipes 17, 19 and 21, respectively.

In the illustrative embodiment, the diameter of the fluid pressure pipe 17 and the diameter of the outwardly extending annular collar or flue 4 with which it is connected, is somewhat smaller than the diameters of the fluid pressure pipes 19 and 21 and the outwardly extending annular collars or flues 5 and 8 with which they are connected. This, of course, is for illustrative purposes only, since various other arrangements are contemplated.

The material of the two semi-spherical steel shells 1 and 6 may widely vary, but they may very acceptably be composed of A 212 Firebox Steel which is characterized by a tensile strength of approximately 77,400 p.s.i. The material of the pipes 17, 19 and 21 may likewise widely vary; but they may very acceptably be composed of Grade B Pipe Steel, the tensile strength of which is approximately 77,000 p.s.i.

As in the case of the meeting or adjoining edges of the two semi-spherical pressed or forged steel shells 1 and 6 the peripheral portions of the ends of the pipes 17, 19 and 21 and the outer ends of the outwardly extending annular collars 4, 5 and 8 to which they are connected are bevelled at approximately 37.5° and joined together by welding.

All of the welds described herein are indicated at 23; and it is essential to the teachings of the invention that they be continuous, and full-penetration welds, as distinguished from "fillet" welds, etc.

The approximate 37.5° bevel or chamfer at the adjoining edges of the two semi-spherical steel shells 1 and 6 and the approximate 37.5° bevel or chamfer at the outer ends of the outwardly extending annular collars 4, 5 and 8 and the adjoining ends of the fluid pressure pipes (17, 19 and 21) is entirely satisfactory since the given wall-thicknesses are approximately one-half inch, and therefore not greater than three-fourths inch. In situations where the wall-thickness of the pipes and spherical connector member is greater than three-fourths inch, bevels or chamfers of different angularity would be employed, in conformity with the requirements of the American Society of Mechanical Engineers.

As will be noted, the location of the continuous and full penetration weld 23 which connects the two semi-spherical shells 1 and 6 is at an angle of 45° with respect to the center-lines of the pipes (17, 19 or 21) which are connected thereto. Thus, no pipe-connecting welds overlap with the weld which connects the two semi-spherical shells, which is essential to the present invention.

A method of producing the outwardly extending annular collars or flues 4, 5 and 8 on the semi-spherical steel shells 1 and 6 is schematically shown in FIGS. 5 through 9 as comprising 1. burning a lead hole X in the shell
2. forming a centered hole at the lead hole X with a bottom ram plug 25 which is moved upwardly and into contact therewith by a follower 26 and
3. moving a flueing plug 28 on a follower 30 downwardly into contact with the metal surrounding the centered hole until the displaced metal assumes the form of the outwardly extending annular collar or flue (4, 5 or 8, as the case may be).

When commercial steel plates of substantially uniform wall-thickness are formed into semi-spherical shells 1 in accordance with conventional pressing operations, preparatory to the formation of the flues therein, deviations in wall-thickness at certain points will be observed. In the pressing or forging of a semi-spherical shell 1 of fairly substantial radius, such as 16 inches, there will be noted a thinning-out of approximately one-sixteenth inch about one-half the distance from the center of its crown to its periphery where it is to be welded to its counterpart and at its periphery a thickening-up of approximately one-sixteenth inch in wall-thickness.

Figure 5:
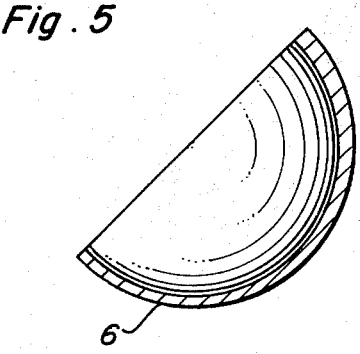
FIG. 5 is a sectional elevational view on a reduced scale of one of the hemispheres which is used to form the hollow spherical connector member, and prior to the formation of any opening therein, the same being characterized by having progressively increased wall-thickness toward its periphery than at its center.
Figure 6:
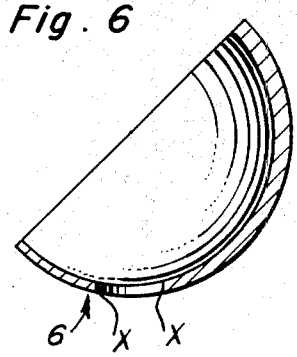
FIG. 6 is a view which is similar to that of FIG. 5 but illustrating the hemisphere after a lead hole has been burned therein by a cutting torch (not shown)
Figure 7:
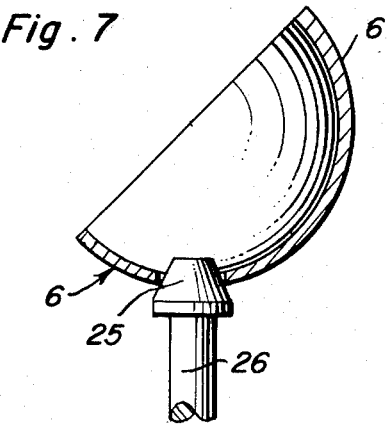
FIG. 7 is a view which is similar in nature to those of FIGS. 5 and 6, but illustrating the application of a bottom ram plug to the burned lead hole of FIG. 6.
Figure 8:
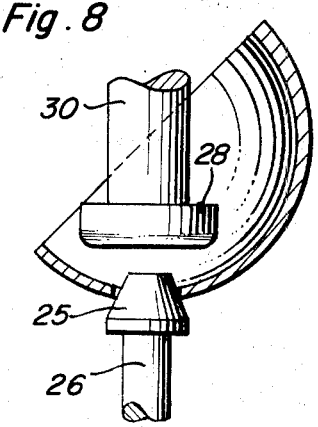
FIG. 8 is a sectional elevational view illustrating the hemisphere of FIG. 7 immediately prior to the application thereto of a flueing plug.
Figure 9:
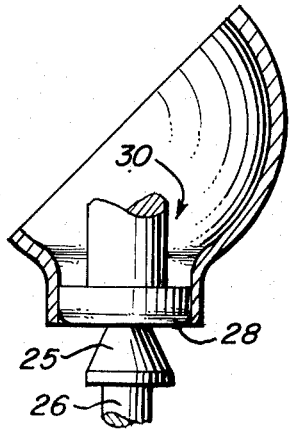
FIG. 9 is a view which is similar to that of FIG. 7, but illustrating the hemisphere immediately after the application of the aforementioned flueing plug.

Since the outwardly extending integral collars of flues 2 fall within the aforementioned thinned areas, and since the "pulling" or forming of these collars or flues in the manner illustrated in the schematic showing of FIG. 5 results in an outwardly tapering, or thinning-out, of the wall-thicknesses thereof toward their outer ends, the present invention includes the commencement of the formation of the hemi-spherical shells 1 and 6 with plate having a thickness which will compensate for these thinned-out areas.

For example, when an 18-inch Standard Weight Pipe, having a wall-thickness of approximately 0.250 inch, is to be connected to a spherical connector member having a 32-inch diameter, plate having a wall-thickness of 0.7812 inch may be utilized. As shown, the "pulling" or forming of the outwardly extending integral collars or flues 4, 5 and 8 results in an outward tapering of the wall-thickness thereof to a point where it more or less exactly matches the wall-thickness of the adjacent end of the pipe with which it connects. Were the wall of the hollow spherical connector member surrounding the opening (2, 3 or 7) therein to be only 0.250 inch in thickness, as in the case of the wall-thickness of the pipes 17, 19 or 21, there would be no reinforcement.

In all instances a smooth curve or radius connects the inner surface of the hollow spherical connector member with the inner surface of the intercommunicating outwardly extending collar or flue (4, 5 or 8); and the increase in the thickness of the metal running back from the outer end of the flue to the circular opening in the sphere is substantial.

Because of the very nature of the present invention, including the use of plate of substantially increased initial wall-thickness to form the semi-spherical shells 1 and 6, the area surrounding the openings or ports to be reinforced, as defined by the Codes referred to earlier herein, can very easily be made to constitute 100 percent reinforcement; and the method of obtaining it, besides being accurate, is simple and inexpensive.

Figure 2:
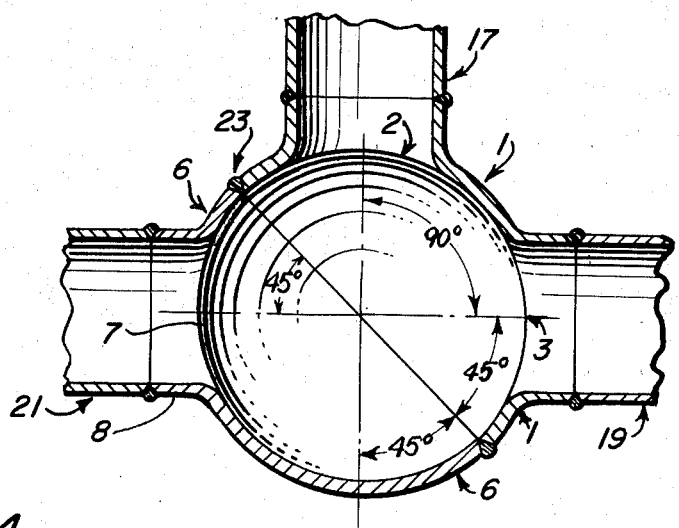
FIG. 2 is a longitudinal sectional elevational view of a connection assembly which has been constructed in accordance with the teachings of the present invention, the same comprising a spherical connector member with flued openings therein and fluid pressure pipes which are attached to and communicate with said flued openings.
Figure 4:
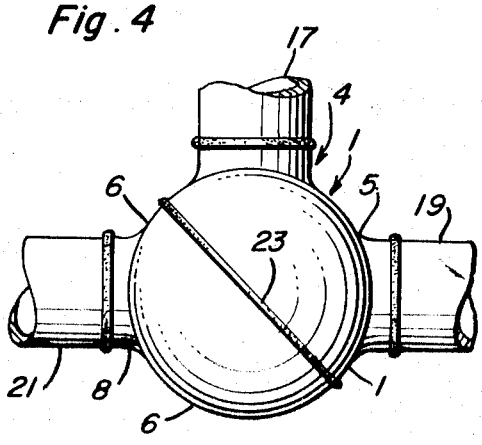
FIG. 4 is an elevational view illustrating the elements of FIG. 2 as assembled, and on a smaller scale.

As will be further understood by those skilled in the art, the showing in FIG. 2 of a semi-sphere 1 with two circular openings 2 and 3 therein, as coupled with a semi-sphere 6 with a single circular opening therein, is by way of illustration only; and this is also the case with respect to differences in diameter as between said circular openings. Both semi-spheres may, for example, have but a single circular opening (to form an elbow) or both semi-spheres may have two openings (to form a cross); and both full size and reducing connectors are contemplated.

However, the circular openings (of whatever number) in both semi-spheres are on an axis which is at an angle of approximately 45° with respect to a plane which contains the periphery of that particular semi-sphere. In this way, the various circular openings around which the integral outwardly extending collars or flues (4, 5 and 8) are formed do not interfere with the continuous, full-penetration weld 23 which connects the two semi-spheres 1 and 6; while at the same time providing versatility of choice with respect to the number of outlets there are to be in a given hollow, spherical connector member.

As previously mentioned, the connection of the fluid pressure pipes 17, 19 or 21 with the outer ends of the outwardly extending integral collars or flues 4, 5 or 8 permits ready X-ray examination of the welds thereat, which is a very desirable feature.

Moreover, the advantages of a hollow spherical connector, over a connector member of any other shape, are obtained.

An embodiment of the present invention contemplates the use on either or both of the semi-spherical shells 1 and 6 of but a single outwardly extending integral collar or flue (such as shown at 4, 5 or 8); and with one or all of the other circular openings communicating with the fluid pressure pipe(s) by direct attachment (welding) of the end of the said pipe(s) to the adjacent surface of the semi-sphere, as shown and described in my U.S. Pat. No. 3,186,431; or by the intermediary of an insert type collar or hollow stub as shown and described in my U.S. Pat. application Ser. No. 156,348 filed June 24, 1971.

More specifically, it may, under certain circumstances, be advantageous to utilize but one or two of the integrally formed outwardly extending collars or flues—with the welding thereto of the fluid pressure pipe(s) at a position which is substantially spaced from the periphery of the hollow sphere as may be desired by certain types of X-ray examination of the connecting welds—but with the fluid pressure pipe(s) connected to other ports of the hollow sphere not so characterized, and embodying the teachings of either of the other two (2) inventions, i.e. U.S. Pat No. 3,186,431 or U.S. Pat. application Ser. No. 156,348 filed June 24, 1971.

Having thus described the invention, what I claim as new and desire to secure by Letters Patent is:

I claim:

1. A metallic pipe connector for pressure pipe lines comprising;
   a. a pair of substantially semi-spherical shells in opposed relationship with their adjoining edges connected together with a continuous weld, thus forming a hollow sphere;
   b. each of said semi-spherical shells being provided with at least one circular opening in the wall thereof;
   c. at least two sleeve-like members formed integrally from the wall of said semi-spherical shells and projecting outwardly and away from the exterior surface of said shells;
   d. a passageway in each of said outwardly projecting sleeve-like members communicating with the circular opening in the wall of the semi-sphere by which it is carried;
   e. the axes of all of said circular openings and said outwardly projecting sleeve-like members being at an angle of approximately 45° with respect to the edges of the semi-spheres by which they are carried;
   f. the diameter and wall-thickness of the metal of the hollow sphere which surrounds the circular openings being such as to adequately compensate by way of reinforcement for the weakening of the wall of the hollow sphere caused by the formation of said openings;
   g. a pipe attached to each of said said outwardly projecting sleeve-like members by a continuous weld and communicating with the passageways therein;

h. the cross-section of the adjacent end of said pipe corresponding to the cross-section of the outer end of the outwardly projecting member to which it is connected, said adjacent and outer ends and the latter continuous weld being spaced outwardly a substantial distance from the exterior surface of said shells.

2. The pipe connector of claim 1 wherein the continuous weld joining the pair of semi-spherical shells is of the full penetration type.

3. The pipe connector of claim 1 wherein all of the continuous welds are of the full penetration type.

4. The pipe connector of claim 1 wherein the inside and outside diameter of said pipe corresponds to the inside and outside diameters of the outer ends of the outwardly projecting sleeve-like portion of the hollow sphere with which they connect.

* * * * *